| United States Patent [19] | [11] Patent Number: 5,023,295 |
|---|---|
| Bosch et al. | [45] Date of Patent: Jun. 11, 1991 |

[54] COMPOSITIONS SUITABLE FOR COATING THE SURFACE OF ELECTRICAL HIGH-VOLTAGE INSULATORS

[75] Inventors: Erhard Bosch, Burgkirchen, Fed. Rep. of Germany; Dietrich Wolfer, Oberndorf; Reinhard Maier, Braunau, both of Austria

[73] Assignee: Wacker-Chemie GmbH, Munich, Fed. Rep. of Germany

[21] Appl. No.: 404,476

[22] Filed: Sep. 8, 1989

[30] Foreign Application Priority Data

Sep. 16, 1988 [DE] Fed. Rep. of Germany ....... 3831479

[51] Int. Cl.$^5$ .................................... C08K 3/10
[52] U.S. Cl. ..................... 524/783; 524/188; 524/431; 524/435; 524/730; 524/785
[58] Field of Search ............... 524/783, 431, 435, 188, 524/785, 730

[56] References Cited

U.S. PATENT DOCUMENTS 4,678,827  7/1987  Itoh et al. ............................ 524/188
4,898,910  2/1990  Kamis et al. ........................ 524/431

Primary Examiner—Melvyn I. Marquis

[57] ABSTRACT

Compositions for coating the surface of electrical high-voltage insulators, which are stable on storage in the absence of water and can be crosslinked to form elastomers at room temperature when exposed to water comprising (I) a diorganopolysiloxane having terminal groups capable of condensation with (II) a silicon compound having at least three hydrolyzable groups directly bonded to silicon per molecule;

(III) optionally, an organic, nonreactive solvent; and (IV) an additive which is obtained by blending (A) 60 to 80 percent by weight of a diorganopolysiloxane containing 75 to 85 mol percent of dimethylsiloxane units and 15 to 25 mol percent of vinylmethylsiloxane units;

(B) 20 to 35 percent by weight of titanium dioxide or zirconium dioxide;

(C) 0.05 to 0.25 percent by weight of platinum, calculated as the element, in the form of a platinum compound or a platinum complex; and (D) 1 to 5 percent by weight of an organosilicon compound having a basic nitrogen bonded to silicon via carbon, in which the sum of the percentages of (A) to (D) is equal to 100 percent by weight and the percentages by weight of (A) to (D) are based on the total weight of additive (IV).

24 Claims, No Drawings

COMPOSITIONS SUITABLE FOR COATING THE SURFACE OF ELECTRICAL HIGH-VOLTAGE INSULATORS

The invention relates to compositions which are suitable for coating the surface of electrical high-voltage insulators and are stable on storage in the absence of water and can be crosslinked to form elastomers at room temperature when exposed to water.

BACKGROUND OF THE INVENTION

Electrical high-voltage insulators are made of glass, porcelain or plastic. They have a long service life when exposed to normal environmental influences. If they are exposed to severe environmental influences, i.e., high contaminating loads, such as are due, for example, to dust and dirt in an industrial atmosphere, to salt mist in a coastal region or to dust and erosion in a desert atmosphere, these conducting impurities result in flashovers and consequently in a shortening of the service life. It is, therefore, necessary to clean such insulators frequently. Therefore, in order to avoid the need for frequent cleaning of the electrical high-voltage insulators, they are, therefore, coated with organopolysiloxane elastomers which hydrophobize the contaminating loads.

U.S. Pat. No. 4,476,155 to Niemi describes compositions which are suitable for coating the surface of high-voltage insulators, are stable on storage in the absence of water and can be crosslinked to form elastomers at room temperature when exposed to water. These compositions are prepared by mixing a dimethylpolysiloxane having terminal groups capable of condensation with a silane having at least three oxime groups bonded to a silicon atom via oxygen, aluminum hydroxide having an average particle size of less than 5 μm and, optionally, a nonreactive solvent. Niemi discloses using aluminum hydroxide in amounts of from 35 to 55 percent by weight, based on the total weight of the composition composed of dimethylpolysiloxane, silane and aluminum hydroxide.

Therefore, it is an object of the present invention to provide compositions which are stable on storage in the absence of water and can be crosslinked to form elastomers at room temperature when exposed to water and when applied on electrical high-voltage insulators, provide thin coatings which have a good to better creep resistance and arc resistance and better mechanical properties, such as, tensile strength and elongation at break, than the compositions known heretofore. Another object of the present invention is to provide coating compositions for electrical high-voltage insulators having mechanical properties which can be altered in a simple manner. Still another object of the present invention is to provide compositions which are stable on storage in the absence of water and can be crosslinked to form elastomers at room temperature when exposed to water and which, compared with compositions having the same viscosity, yield uniform and continuous coatings when sprayed onto the surface of electrical high-voltage insulators and have only a slight tendency to form drops or runs at the edges of the insulator disks. A further object of the present invention is to provide compositions which are stable on storage in the absence of water and can be crosslinked to form elastomers at room temperature when exposed to water and when applied as a coating to electrical high-voltage insulators provide insulators having a long service life, especially in regions in which they are exposed to severe contamination and moisture.

SUMMARY OF THE INVENTION

The foregoing objects and others which will become apparent from the following description are accomplished in accordance with this invention, generally speaking, by providing a composition which is suitable for coating the surface of electrical high-voltage insulators, are stable on storage in the absence of water and can be crosslinked to form elastomers at room temperature when exposed to water comprising (I) a diorganopolysiloxane having terminal groups capable of condensation with;
(II) a silicon compound having at least three hydrolyzable groups directly bonded to silicon per molecule;
(III) optionally, an organic, nonreactive solvent; and
(IV) an additive which is obtained by blending
   (A) 60 to 80 percent by weight of a diorganopolysiloxane containing 75 to 85 mol percent of dimethylsiloxane units and 15 to 25 mol percent of vinylmethylsiloxane units;
   (B) 20 to 35 percent by weight of titanium dioxide or zirconium dioxide;
   (C) 0.05 to 0.25 percent by weight of platinum, calculated as the element, in the form of a platinum compound or a platinum complex; and
   (D) 1 to 5 percent by weight of an organosilicon compound having a basic nitrogen bonded to silicon via carbon, in which the sum of the percentages of (A) to (D) is equal to 100 percent by weight and the percentages by weight in each case is based on the total weight of additive (IV).

DESCRIPTION OF THE INVENTION

The additive (IV) is present in the composition of this invention preferably in amounts of from 1 to 4 percent by weight, based on the total weight of the composition capable of crosslinking to form elastomers, except for the organic solvent (III) which is optionally present in the composition. It imparts high creep resistance and arc resistance and also low flammability to the organopolysiloxane elastomers.

The constituent (A) of additive (IV) of this invention is a vinyl-rich diorganopolysiloxane, which optionally contains, in addition to dimethylsiloxane units and vinylmethylsiloxane units, additional siloxane units such as phenylmethylsiloxane units in amounts of not more than 18 mol percent.

Constituent (B) of additive (IV) of this invention is preferably a finely divided titanium dioxide produced pyrogenically in the gas phase.

Examples of compounds or complexes of platinum used as constituent (C) of additive (IV) of this invention are $H_2[PtCl_6]\cdot 6H_2O$, platinum-olefin complexes, platinum-alcohol complexes, platinum-alcoholate complexes, platinum-ether complexes, platinum-aldehyde complexes, platinum-ketone complexes, including reaction products of $H_2[PtCl_6]\cdot 6H_2O$ and cyclohexanone, platinum-vinylsiloxane complexes, in particular platinum-1,3-divinyl-1,1,3,3-tetramethyldisiloxane complexes with or without a detectable organic halogen, platinum-norbornadiene-methylacetonate complexes, bis(τ-picoline)platinum dichloride, trimethylenedipyridine-platinum dichloride, dicyclopentadieneplatinum dichloride, dimethylsulfoxide-ethyleneplatinum(II) dichloride and also reaction products of platinum tetrachloride with an olefin and a primary amine or a secondary amine or a primary and a secondary amine, such as the reaction product of platinum tetrachloride dissolved in 1-octene with sec-butylamine, or ammonium-platinum complexes in accordance with EP-B 110,370.

Preferably, the organosilicon compounds having a basic nitrogen bonded to silicon via carbon which form constituent (D) of additive (IV) of this invention are those which are selected from the group consisting of silanes of the formula $$Y_aR_bSi(OR^1)_{4-a-b},$$

where R represents the same or different monovalent hydrocarbon radical containing 1 to 8 carbon atoms per radical, $R^1$ represents the same or different alkyl groups containing 1 to 4 carbon atoms per radical or a radical of the formula $-SiR_3$, R is the same as above, and Y represents the same or different monovalent SiC-bonded organic radicals having a basic nitrogen, a is 1 or 2 and b is 0, 1 or 2, and disiloxanes of the formula $$(Y_cR_dSi)_2O,$$

where R and Y have the same meaning as above, c is 0, 1, 2 or 3, preferably 1, with the proviso that the disiloxanes have at least one Y radical, and d is 0, 1, 2 or 3, preferably 2.

The organosilicon compounds (D) having a basic nitrogen bonded to silicon via carbon in additive (IV) of this invention may, however, also be organo(poly)siloxanes containing a maximum of 10 Si atoms composed of units of the formula $$Y_xR_ySi(OR^1)_zO_{\frac{4-x-y-z}{2}}$$

where R and $R^1$ are the same as above,; x is 0, 1 or 2; y is 0, 1, 2 or 3; and z is 0, 1 or 2.

Examples of hydrocarbon radicals represented by R are the methyl, ethyl, n-propyl, isopropyl and 2-ethylhexyl radical, and also butyl radicals; radicals made up of carbon and hydrogen atoms containing an aliphatic multiple bond such as the vinyl and allyl radicals; cycloaliphatic hydrocarbon radicals such as the cyclopentyl radical and cyclohexyl radicals, and also the methylcyclohexyl radicals; aromatic hydrocarbon radicals such as the phenyl radical and xenyl radicals; alkaryl radicals such as tolyl radicals; and aralkyl radicals such as the benzyl radical. Preferably, the hydrocarbon radicals R are, however, free of aliphatic multiple bonds, in particular if they are bonded to silicon atoms to which a basic nitrogen is also bonded via carbon. Because of their availability, it is preferred that at least 50 percent of the number of R radicals are methyl radicals.

The above mentioned examples of alkyl radicals represented by R containing 1 to 4 carbon atoms per radical are also representative for the $R^1$ radicals.

Preferably, the Y radicals are those of the formula $$R^2NHR^3-,$$

where $R^2$ represents hydrogen or the same or different alkyl or cycloalkyl or aminoalkyl radicals containing 1 to 8 carbon atoms per radical and $R^3$ represents the same or different straight-chain or branched hydrocarbon radicals free of aliphatic multiple bonds and containing one carbon atom or 3 or 4 carbon atoms per radical, in particular a radical of the formula $$-(CH_2)_3-.$$

The examples of alkyl and cycloalkyl radicals represented by R are examples of alkyl or cycloalkyl radicals represented by $R^2$.

Examples of aminoalkyl radicals represented by $R^2$ are those of the formula
$H_2N(CH_2)_3-$
$H_2N(CH_2)_2NH(CH_2)_3-$
$H_2N(CH_2)_2-$
$(H_3C)_2NH(CH_2)_2-$
Hphd $2N(CH_2)_4-$
$H(NHCH_2CH_2)_3-$ and
$C_4H_9NH(CH_2)_2NH(CH_2)_2-$.

Preferably,
N-(2-aminoethyl)-3-aminopropyltrimethoxysilane,
N-(2-aminoethyl)-3-aminopropyltriethoxysilane,
N-(2-aminoethyl)-3-aminopropylmethyldimethoxysilane,
3-aminopropyltriethoxysilane,
N-(cyclohexyl)-3-aminopropyltrimethoxysilane,
N-(2-aminoethyl)-3-aminopropyltris(trimethylsiloxy)silane, and
1,2-bis[N-(2-aminoethyl)-3-aminopropyl]-1,1,2,2-tetramethyldisiloxane
are used as organosilicon compounds (D) having basic nitrogen bonded to silicon via carbon in additive (IV) of this invention. The preferred organosilicon compound (D) is N-(2-aminoethyl)-3-aminopropyltrimethoxysilane.

The constituents (A) to (D) of additive (IV) of this invention are blended with each other in an agitator or kneader. Additive (IV) can be used after agitating or kneading for at least two hours and subsequently allowing the mixture to stand at room temperature for two to three days. Preferably, the mixture is made ready-to-use by heating it for at least 120 minutes at 80° to 150° C.

The vinyl-rich diorganopolysiloxane (A), the platinum compound or the platinum complex (C) and also the organosilicon compound (D) having a basic nitrogen bonded to silicon via carbon are reacted with each other by being allowed to stand for days or by heating and together with the metal oxides (B), which only intensify the action, are added as additive (IV) in only relatively small amounts to the other constituents of the compositions which are capable of crosslinking to form organopolysiloxane elastomeric coatings having high creep resistance and high arc-resistance and also low flammability.

Diorganopolysiloxanes (I) having terminal groups capable of condensation, which are preferably used according to this invention are those of the formula $$HO(SiR^4_2O)_mSiR^4_2OH,$$

where $R^4$ represents a monovalent hydrocarbon radical having from 1 to 18 carbon atoms per radical and a halogenated hydrocarbon radical having from 1 to 18 carbon atoms per radical and m is an integer having a value of at least 10. Preferably, the average viscosity of the diorganopolysiloxanes (I) is 500 to $1 \times 10^6$ mPa.s at 25° C.

In the preparation of the compositions of this invention, the diorganopolysiloxanes (I) are preferably used in amounts of from 50 to 90 percent by weight, based on the total weight of the composition without the organic solvent (III) which is optionally used.

Within, or along the siloxane chain of the above formula, other siloxane units may also be present in addition to the diorganosiloxane units ($SiR^4_2O$), which are not usually represented by formulas of this type. Examples of other siloxane units, which are present generally as impurities and are more or less difficult to avoid, are those of the formula $R^4SiO_{3/2}$, $R^4_3SiO_{\frac{1}{2}}$ and $SiO_{4/2}$, where $R^4$ is the same as above. Preferably, the amount of such siloxane units other than diorganosiloxane units, however, does not exceed more than about 5 mol percent of the siloxane units present in the diorganopolysiloxanes (I) having terminal groups capable of condensation. The hydroxyl groups in the formula specified above for diorganopolysiloxanes (I) having terminal groups capable of condensation may, if desired, be completely or partially replaced by other groups capable of condensation, such as alkoxy groups containing 1 to 4 carbon atoms per group.

Silicon compounds (II) having at least three hydrolyzable groups directly bonded to silicon per molecule, are preferably silanes of the formula $R^4_nSiZ_{4-n}$, where n is 0 or 1, $R^4$ is the same as above, Z represents the same or different hydrolyzable groups and is selected from the group comprising

| oxime groups | $-ON=X$ |
| amino groups | $-NR^7_2$ |
| acylamino groups | $-NR^7COR^7$ |
| amineoxy groups | $-ONR^7_2$ |
| acyloxy groups | $-OOCR^7$ and |
| hydrocarbonoxy and substituted hydrocarbonoxy groups | $-OR^7$, | where X represents the same or different radicals of the formula $R^5_2C=$ or $R^6C=$, where $R^5$ represents the same or different monovalent hydrocarbon radicals having from 1 to 5 carbon atoms per radical and $R^6$ represents a divalent hydrocarbon radical containing 5 to 6 carbon atoms, and $R^7$ represents hydrogen or the same or different monovalent hydrocarbon radicals, substituted monovalent hydrocarbon radicals, and partial hydrolyzates thereof having from 2 to 10 silicon atoms per molecule.

Examples of hydrocarbon radicals represented by $R^4$ are alkyl radicals such as methyl, ethyl, n-propyl, isopropyl, n-butyl and sec-butyl radicals and also hexyl and octadecyl radicals; aliphatic radicals having a carbon-carbon double bond such as the vinyl and allyl radical; cycloaliphatic hydrocarbon radicals such as the cyclopentyl and cyclohexyl radicals, and also methylcyclohexyl radicals; aryl radicals such as the phenyl radical and xenyl radicals; alkaryl radicals such as tolyl radicals; and aralkyl radicals such as the benzyl radical.

Examples of halogenated hydrocarbon radicals represented by $R^4$ are haloalkyl radicals such as the 3,3,3-trifluoropropyl radical; and haloaryl radicals such as o-, p- and m-chlorophenyl radicals.

Because of their availability, it is preferred that at least 50 percent of the number of $R^4$ radicals, and more preferably at least 90 percent of the number of $R^4$ radicals, are methyl radicals.

The most important examples of hydrocarbon radicals represented by $R^5$ are the methyl and ethyl radicals. The most important example of a radical of the formula $R^6C=NO-$ is the cyclohexanoneoxime radical.

The examples of the hydrocarbon radicals represented by $R^4$ are also representative examples of the hydrocarbon radicals represented by $R^7$.

Silicon compounds (II) containing at least three hydrolyzable groups directly bonded to silicon per molecule, which are preferably employed are silanes of the formula $R^4_nSi(ON=X)_{4-n}$, where $R^4$, X and n are the same as above, and partial hydrolyzates thereof containing 2 to 10 silicon atoms per molecule.

Other examples of preferred silanes are methyltris-methylethylketoxime)silane and tetra(methylethylketoxime)silane.

Examples of amino groups are the n-butylamino, secbutylamino and cyclohexylamino groups.

An example of an acylamino group is the benzamido group.

Examples of amineoxy groups are the dimethylamineoxy and diethylamineoxy groups.

Examples of acyloxy groups are the formyloxy and acetoxy groups.

Examples of hydrocarbonoxy groups are the methoxy, ethoxy and isopropenyloxy group.

An example of a substituted hydrocarbonoxy group is the methoxyethyleneoxy group.

Preferably, in the preparation of the compositions of this invention, the silicon compounds (II) having at least three hydrolyzable groups directly bonded to silicon per molecule are used in amounts of from 3 to 15 percent by weight, and more preferably from 5 to 10 percent by weight, based on the total weight of the composition without the organic solvent (III) which is optionally present in the composition.

In the preparation of the compositions of this invention, the organic nonreactive solvents (III) are optionally used concomitantly. Examples of organic nonreactive solvents which can be used concomitantly in the preparation of the compositions of this invention in order to impart to the compositions a sufficiently low viscosity for processing are aliphatic, aromatic and chlorinated hydrocarbons such as petroleum ethers, white spirits, toluene, xylene, trichloroethene and tetrachloroethene. Organic nonreactive solvents are used concomitantly in amounts preferably from 10 to 80 percent by weight, and more preferably from 30 to 70 percent by weight, based on the total weight of the composition together with the organic solvent (III).

Additional substances which can be used in the preparation of the compositions of this invention, in addition to additive (IV), are preferably reinforcing inorganic fillers, nonreinforcing inorganic fillers, condensation catalysts, plasticizers, agents for improving the adhesion of the elastomers, obtained according to this invention, on the substrates on which the elastomers were formed, pigments and soluble dyestuffs. Still, other additives which may be used are substances such as odoriferous substances, fungicides, resinous organopolysiloxanes, including those composed of $(CH_3)_3SiO_{1/2}$ and $SiO_{4/2}$ units, purely organic resins such as homopolymers or copolymers of acrylonitrile, polystyrene, polyvinyl chloride or polypropylene, in which such purely organic resins, in particular copolymers of styrene and n-butyl acrylate may have already been prepared in the presence of a diorganopolysiloxane having terminal groups capable of condensation by polymerizing the monomers by means of free radicals, corrosion inhibitors, polyglycols, which may be esterified or etherified, oxidation inhibitors, heat stabilizers, agents which impart flame retardation, light-protection agents and agents for prolonging the skin formation time such as silanes containing an SiC-bonded mercaptoalkyl radical, and also cell-producing agents, for example, azodicarbonamide.

Examples of reinforcing inorganic fillers, that is, inorganic fillers having a surface area of at least 50 m²/g, are, in particular, pyrogenically produced silicon dioxides, silicic acid hydrogels dehydrated with the retention of the structure and other types of precipitated silicon dioxide having a surface area of at least 50 m²/g.

Examples of nonreinforcing inorganic fillers, that is, inorganic fillers having a surface area of less than 50 m²/g, are, or may be, quartz powder, diatomaceous earth, iron oxide, zinc oxide, titanium oxide, calcium carbonate, magnesium carbonate, zinc carbonate, carbon black, mica and Neuburg chalk.

All these reinforcing and nonreinforcing inorganic fillers may be hydrophilic or may be hydrophobized, for example, by treating with organosilanes or organosiloxanes, or organosilazanes such as hexamethyldisilazane or by etherification of hydroxyl groups with alkoxy groups. Only one type of filler may be used; however, a mixture of at least two fillers may also be used. These fillers are generally used in amounts of preferably from 5 to 30 percent by weight, based on the total weight of the composition without the organic solvent (III).

Examples of condensation catalysts are butyl titanates and organic tin compounds such as di-n-butyltin diacetate, di-n-butyltin dilaurate and reaction products of a silane having at least two monovalent hydrocarbon radicals bonded to silicon via oxygen per molecule and optionally substituted by an alkoxy group as hydrolyzable groups, or an oligomer thereof, with diorganotin diacylate, all the valencies of the tin atoms being saturated in these reaction products by oxygen atoms of the grouping

or by SnC-bonded monovalent organic radicals. The preparation of reaction products of this type is described in U.S. Pat. No. 4,460,761 to Schiller et al. The condensation catalyst is used in amounts of preferably from 0.01 to 1.00 percent by weight, based on the total weight of the composition without the organic solvent (III).

Examples of agents for improving the adhesion of the elastomers, obtained from the compositions of this invention, on the substrates on which the elastomers are formed, are organofunctional silanes, such as amino functional silanes, for example, gamma-aminopropyltriethoxysilane and N-(2-aminoethyl)-3-aminopropyltriethoxysilane. They are used in amounts preferably from 0.5 to 5.0 percent by weight, and more preferably from 1.0 to 1.5 percent by weight, based on the total weight of the composition without the organic solvent (III).

Examples of plasticizers are dimethylpolysiloxanes which are liquid at room temperature and are terminally blocked by trimethylsiloxy groups and which have a viscosity of at least 10 mPa.s. They are used in amounts of preferably from 5 to 50 percent by weight, based on the total weight of the composition without the organic solvent (III).

The normal water content of the air is sufficient to crosslink the compositions of this invention. The crosslinking may be carried out, if desired, also at temperatures higher or lower than room temperature, for example at −5° C. to 10° C. or at 30° C. to 50° C.

The compositions of this invention are used to coat the surface of insulators, for example, upright insulators, bushings, measuring transducers and rod insulators which are of porcelain, glass or plastic and are used in the medium-voltage and high-voltage sector. In this connection, the coating can be carried out, for example, by spraying, brushing, rolling or dipping. The coating is preferably carried out by spraying. The thickness of the elastomeric coating, according to the invention, is preferably at least 0.25 mm.

In the following examples, all parts and percentages are by weight unless otherwise specified.

The mixture of platinum-vinylsiloxane complex and diluent used in the following examples was prepared as follows:

About 20 parts of sodium bicarbonate were added to a mixture containing 10 parts of $H_2PtCl_6 \cdot 6H_2O$, 20 parts of 1,3-divinyl-1,1,3,3-tetramethyldisiloxane and 50 parts of ethanol. The mixture was heated for 30 minutes to boiling under reflux while stirring, then allowed to stand for 15 hours and subsequently filtered. The volatile constituents were distilled off from the filtrate at about 16 hPa (abs.). About 17 parts of a liquid were obtained as residue and the liquid was dissolved in benzene. The solution was filtered and the benzene was distilled off from the filtrate. The residue was blended with dimethylpolysiloxane having dimethylvinylsiloxane units as terminal units and having a viscosity of 1400 mPa.s at 25.C as diluent in an amount such that the mixture contains 1 percent by weight of platinum, calculated as the element.

Example 1

(a) About 100 parts of a dimethylpolysiloxane having 20 mol percent of vinylmethylsiloxane units and having a viscosity of 50,000 mPa.s at 25° C. are homogeneously blended in a mixer with 50 parts of titanium dioxide produced pyrogenically in the gas phase. Then 25 parts of the mixture of platinum-vinylsiloxane complex and diluent containing 1 percent by weight of platinum, calculated as the element, are added. After mixing the resultant mixture, 4 parts of N-(2-aminoethyl)-3-aminopropyltrimethoxysilane are added to the mixture. The mixture is then heated slowly to 150° C. while stirring vigorously and maintained at 150° C. for two additional hours with agitation.

(b) About 29.4 parts of a dimethylpolysiloxane having one Si-bonded hydroxyl group in each terminal unit and having a viscosity of 20,000 mpa.s at 25° C. are blended in the following sequence with 6.1 parts of silicon dioxide produced pyrogenically in the gas phase and having a BET surface area of 150 m²/g, 1.0 part of the additive, whose preparation was described in (a) above, 60.0 parts of a white spirit with a low aromatics content and having a boiling range of 100 to 140° C. at 1020 hPa (abs.), 2.85 parts of methyltris(methylethylketoxime)silane, 0.6 parts of N-(2-aminoethyl)-3-aminopropyltrimethoxysilane and 0.05 parts of a reaction product which was prepared by heating a mixture containing 4 parts of tetraethyl silicate and 1 part of di-n-butyltin diacetate for 6 hours at 120° C. at the pressure of the ambient atmosphere while stirring and simultaneously distilling off the ethyl acetate formed.

A solvent-containing flowable RTV-1 composition is obtained which is stable on storage provided water is excluded. The composition has a viscosity of 3200 mPa.s at 25° C. and eminently capable of being sprayed onto the surface of insulators, for example, with an airless apparatus. When exposed to atmospheric moisture, the composition reacts to form a smooth rubber-like coating with simultaneous evaporation of the solvent.

The composition was used to produce 2 mm thick films whose mechanical and electrical properties were determined after storing for 14 days at room temperature. The results are summarized in Table 1.

TABLE 1

| Shore A hardness | DIN 53 505 | 44 |
| Tensile strength | DIN 53 504 | 2.6 N/mm² |
| Elongation at break | DIN 53 504 | 330 percent |
| Creep resistance | DIN 57 303 at 3.5 kV | >360 min |
| Arc resistance | DIN 57 441 | 240 sec |

Comparison Example 1

The procedure described in Example 1 is repeated, except that no additive is used. A composition having a viscosity of 3100 mPa.s at 25° C. is obtained.

The composition was used to produce 2 mm thick films whose mechanical and electrical properties were determined after storing for 14 days at room temperature. The results are summarized in Table 2.

TABLE 2

| Shore A hardness | DIN 53 505 | 42 |
| Tensile strength | DIN 53 504 | 2.6 N/mm² |
| Elongation at break | DIN 53 504 | 340 percent |
| Creep resistance | DIN 57 303 at 3.5 kV | 53 min |
| Arc resistance | DIN 57 441 | 138 sec |

Comparison Example 2

About 30.7 parts of a dimethylpolysiloxane having one Si-bonded hydroxyl group in each terminal unit and having a viscosity of 20,000 mPa.s at 25° C. are blended with 41.1 parts of an aluminum oxide hydrate having an average particle size of 0.7 μm, a specific gravity of 2.42 g/cm³ and 35 percent by weight of water of hydration, while heating at 175° C. under full vacuum for one hour. After cooling this mixture to room temperature, 22 parts of a white spirit having a low aromatics content and having a boiling range of 100° to 140° C. at 1020 hPa, 6.1 parts of methyltris(methylethylketoxime)silane and 0.1 part of dibutyltin dioctoate are blended with this mixture.

A solvent-containing flowable RTV-1 composition according to U.S. Pat. No. 4,476,155 having a viscosity of 3000 mPa.s is obtained. In contrast to the composition of this invention prepared accordinq to Example 1, the composition prepared according to the patent (Comparison Example 2) cannot be sprayed onto the surface of insulators, for example, with an airless apparatus. If the composition is diluted with further white spirit in quantities of 33 percent white spirit, based on the total weight of the composition, it can be sprayed onto the surface of insulators, for example, with an airless apparatus. However, a uniform coating is not obtained and runs are formed at the edges of the insulator disks.

The composition was used to produce 2 mm thick films whose mechanical and electrical properties were determined after storing for 14 days at room temperature. The results are summarized in Table 3.

TABLE 3

| Shore A hardness | DIN 53 505 | 57 |
| Tensile strength | DIN 53 504 | 1.9 N/mm² |
| Elongation at break | DIN 53 504 | 130 percent |
| Creep resistance | DIN 57 303 at 3.5 kV | 290 min |
| Arc resistance | DIN 57 441 | 200 sec |

Example 2

About 21.1 parts of a dimethylpolysiloxane having one Si-bonded hydroxyl group in each terminal unit and having a viscosity of 20,000 mPa.s at 25° C. are blended in the following sequence with 8.5 parts of a silicon dioxide produced pyrogenically in the gas phase and having a BET surface area of 150 m²/g, 0.85 parts of the additive whose preparation was described in Example 1(a) above, 66.6 parts of a white spirit having a low aromatics content and having a boiling range of 100° to 140° C. at 1020 hPa (abs.), 2.4 parts of methyltris(methylethylketoxime)silane, 0.5 parts of N-(2-aminoethyl)-3-aminopropyltrimethoxysilane and 0.05 parts of a reaction product which was prepared by heating a mixture containing 4 parts of tetraethyl silicate and 1 part of di-n-butyltin diacetate for 6 hours at 120° C. at the pressure of the ambient atmosphere while stirring and simultaneously distilling off the ethyl acetate formed.

A solvent-containing flowable RTV-1 composition is obtained which is stable on storage when water is excluded. The composition has a viscosity of 5400 mPa.s at 25° C. and eminently capable of being sprayed onto the surface of insulators, for example, with an airless apparatus. When exposed to atmospheric moisture, the composition reacts to form a smooth rubber-like coating with simultaneous evaporation of the solvent.

The composition was used to produce 2 mm thick films whose mechanical and electrical properties were determined after storing for 14 days at room temperature. The results are summarized in Table 4.

TABLE 4

| Shore A hardness | DIN 53 505 | 52 |
| Tensile strength | DIN 53 504 | 5.2 N/mm² |
| Elongation at break | DIN 53 504 | 440 percent |
| Creep resistance | DIN 57 303 at 3.5 kV | >360 min |
| Arc resistance | DIN 57 441 | 280 sec |

Example 3

A mixture containing 75 parts of a dimethylpolysiloxane having one Si-bonded hydroxyl group in each terminal unit and having a viscosity of 50,000 mPa.s at 25° C., 5 parts of hexamethyldisilazane and 2.5 parts of water is kneaded in a Z-type kneader with 20 parts of a silicon dioxide produced pyrogenically in the gas phase and having a BET surface area of 150 m²/g until a homogeneous mixture is obtained. The mixture is then heated to 120° C., kneaded for 5 hours at 120° C. and then excess hexamethyldisilazane and water are distilled off at 120° C. and 100 hPa (abs.). About 37.7 parts of the mixture thus obtained having a viscosity of 300,000 mPa.s at 25° C. are blended in the following sequence with 1.1 parts of the additive whose preparation was described in Example 1(a) above, 57.5 parts of a white spirit having a low aromatics content and having a boiling point of 100 to 140° C. at 1020 hPa (abs.), 3.0 parts of methyltris(methylethylketoxime)-silane, 0.65 parts of N-(2-aminoethyl)-3-aminopropyltrimethoxysilane and 0.05 parts of a reaction product which was prepared by heating a mixture containing 4 parts of tetraethylsilicate and 1 part of di-n-butyltin diacetate for 6 hours at 120° C. at the pressure of the ambient atmosphere while stirring and simultaneously distilling off the ethyl acetate formed.

A solvent-containing flowable RTV-1 composition is obtained which is stable on storage provided water is excluded. The composition has a viscosity of 1700 mPa.s at 25° C. and is eminently capable of being sprayed onto the surface of insulators, for example, with an airless apparatus. When exposed to atmospheric moisture, the composition reacts to form a smooth rubber-like coating with simultaneous evaporation of the solvent.

The composition was used to produce 2 mm thick films whose mechanical and electrical properties were determined after storing for 14 days at room temperature. The results are summarized in Table 5.

TABLE 5

| | | |
|---|---|---|
| Shore A hardness | DIN 53 505 | 43 |
| Tensile strength | DIN 53 504 | 4.8 N/mm$^2$ |
| Elongation at break | DIN 53 504 | 480 percent |
| Creep resistance | DIN 57 303 at 3.5 kV | 343 min |
| Arc resistance | DIN 57 441 | 230 sec |

What is claimed is:

1. A composition for coating the surface of electrical high-voltage insulators, which is stable on storage in the absence of water and can be crosslinked to form an elastomer at room temperature when exposed to water comprising
   (I) a diorganopolysiloxane having terminal condensable groups capable of condensation with
   (II) a silicon compound having at least three hydrolyzable groups directly bonded to silicon per molecule; and
   (IV) an additive which is obtained by mixing
      (A) 60 to 80 percent by weight of a diorganopolysiloxane containing 75 to 85 mol percent of dimethylsiloxane units and 15 to 25 mol percent of vinylmethylsiloxane units with
      (B) 20 to 35 percent by weight of a compound selected from the group consisting of titanium dioxide and zirconium dioxide;
      (C) 0.05 to 0.25 percent by weight of platinum, calculated as the element, in the form of a platinum compound or a platinum complex; and
      (D) 1 to 5 percent by weight of an organosilicon compound having a basic nitrogen bonded to silicon via carbon,
in which the sum of the percentages of (A) to (D) is equal to percent by weight and the percentages by weight of (A) to (D) are based on the total weight of the additive (IV).

2. The composition of claim 1, wherein the composition contains an organic nonreactive solvent.

3. The composition of claim 1, wherein the additive (IV) is obtained
   (1) by mixing constituents (A) to (D) and thereafter
   (2) the mixture is heated for at least 120 minutes at 80° to 150° C.

4. The composition of claim 1, wherein the additive (IV) is present in an amount of from 1 to 4 percent by weight, based on the total weight of the composition capable of crosslinking to form an elastomer.

5. The composition of claim 2, wherein the additive (IV) is present in an amount of from 1 to 4 percent by weight, based on the weight of the composition capable of crosslinking to form an elastomer, except for the organic solvent (III).

6. The composition of claim 3, wherein the additive (IV) is present in an amount of from 1 to 4 percent by weight, based on the weight of the composition capable of crosslinking to form an elastomer.

7. The composition of claim 1, wherein (D) the organosilicon compound having a basic nitrogen bonded to silicon via carbon is selected from the group consisting of silanes of the formula $Y_aR_bSi(OR^1)_{4-a-b}$, where R is a monovalent hydrocarbon radical having from 1 to 8 carbon atoms per radical, $R^1$ is a radical selected from the group consisting of alkyl groups having from 1 to 4 carbon atoms per radical and a radical of the formula —SiR$_3$, where R is the same as above, and Y is a monovalent SiC-bonded organic radical having a basic nitrogen, a is 1 or 2 and b is 0, 1 or 2, and disiloxanes of the formula $(Y_cR_dSi)_2O$, where R and Y are the same as above, c is 0, 1, 2 or 3, with the proviso that the disiloxanes have at least one Y radial and d is 0, 1, 2 or 3.

8. The composition of claim 2, wherein (D) the organosilicon compound having a basic nitrogen bonded to silicon via carbon is selected from the group consisting of silanes of the formula $Y_aR_bSi(OR^1)_{4-a-b}$, where R is a monovalent hydrocarbon radical having from 1 to 8 carbon atoms per radical, $R^1$ is a radical selected from the group consisting of alkyl groups having from 1 to 4 carbon atoms per radical and a radical of the formula —SiR$_3$, where R is the same as above, and Y is a monovalent SiC-bonded organic radical having a basic nitrogen, a is 1 or 2 and b is 0, 1 or 2, and disiloxanes of the formula $(Y_cR_dSi)_2O$, where R and Y are the same as above, c is 0, 1, 2 or 3, with the proviso that the disiloxanes have at least one Y radial and d is 0, 1, 2 or 3.

9. The composition of claim 3, wherein (D) the organosilicon compound having a basic nitrogen bonded to silicon via carbon is selected from the group consisting of silanes of the formula $Y_aR_bSi(OR^1)_{4-a-b}$, where R is a monovalent hydrocarbon radical having from 1 to 8 carbon atoms per radical, $R^1$ is a radical selected from the group consisting of alkyl groups having from 1 to 4 carbon atoms per radical and a radical of the formula —SiR$_3$, where R is the same as above, and Y is a monovalent SiC-bonded organic radical having a basic nitrogen, a is 1 or 2 and b is 0, 1 or 2, and disiloxanes of the formula $(Y_c R_d Si)_2 O$, where R and Y are the same as above, c is 0, 1, 2 or 3, with the proviso that the disiloxanes have at least one Y radial and d is 0, 1, 2 or 3.

10. The composition of claim 1, wherein the diorganopolysiloxane (I) has the formula $HO(SiR^4_2O)_m SiR^4_2 OH$, where $R^4$ is selected from the group consisting of a hydrocarbon radical having from 1 to 18 carbon atoms per radical and a halogenated hydrocarbon radical having from 1 to 18 carbon atoms per radical, m is an integer having a value of at least 10 and an average viscosity of from 500 to $1 \times 10^6$ mPa.s at 25° C.

11. The composition of claim 2, wherein the diorganopolysiloxane (I) has the formula $HO(SiR^4_2O)_m SiR^4_2 OH$, where $R^4$ is selected from the group consisting of a hydrocarbon radical having from 1 to 18 carbon atoms per radical and a halogenated hydrocarbon radical having from 1 to 18 carbon atoms per radical, m is an integer having a value of at least 10 and an average viscosity of from 500 to $1 \times 10^6$ mPa.s at 25° C.

12. The composition of claim 3, wherein the diorganopolysiloxane (I) has the formula $HO(SiR^4_2O)_m SiR^4_2 OH$, where $R^4$ is selected from the group consisting of a hydrocarbon radical having from 1 to 18 carbon atoms per radical and a halogenated hydrocarbon radical having from 1 to 18 carbon atoms per radical, m is an integer having a value of at least 10 and an average viscosity of from 500 to $1 \times 10^6$ mPa.s at 25° C.

13. The composition of claim 1, wherein the silicon compound (II) is selected from the group consisting of a silane of the formula $R^4_n SiZ_{4-n}$, where n is 0 or 1, $R^4$ is selected from the group consisting of a hydrocarbon radical having from 1 to 18 carbon atoms per radical and a halogenated hydrocarbon radical having from 1 to 18 carbon atoms per radical and Z is a hydrolyzable group selected from the group consisting of

| oxime groups | $-ON=X$ |
| amino groups | $-NR^7_2$ |
| acylamino groups | $-NR^7 COR^7$ |
| amineoxy groups | $-ONR^7_2$ |
| acyloxy groups | $-OOCR^7$ and |
| hydrocarbonoxy and substituted hydrocarbonoxy groups | $-OR^7$, | where X is selected from the group consisting of $R^5_2 C=$ and $R^6 C=$, where $R^5$ is a monovalent hydrocarbon radical having from 1 to 5 carbon atoms per radical and $R^6$ is a divalent hydrocarbon radical having 5 or 6 carbon atoms, and $R^7$ is selected from the group consisting of hydrogen, monovalent hydrocarbon radicals and substituted monovalent hydrocarbon radicals, and partial hydrolyzates thereof having 2 to 10 silicon atoms per molecule.

14. The composition of claim 2, wherein the silicon compound (II) is selected from the group consisting of a silane of the formula $R^4_n SiZ_{4-n}$, where n is 0 or 1, $R^4$ is selected from the group consisting of a hydrocarbon radical having from 1 to 18 carbon atoms per radical and a halogenated hydrocarbon radical having from 1 to 18 carbon atoms per radical and Z is a hydrolyzable group selected from the group consisting of

| oxime groups | $-ON=X$ |
| amino groups | $-NR^7_2$ |
| acylamino groups | $-NR^7 COR^7$ |
| amineoxy groups | $-ONR^7_2$ |
| acyloxy groups | $-OOCR^7$ and |
| hydrocarbonoxy and substituted hydrocarbonoxy groups | $-OR^7$, | where X is selected from the group consisting of $R^5_2 C=$ and $R^6 C=$, where $R^5$ is a monovalent hydrocarbon radical having from 1 to 5 carbon atoms per radical and $R^6$ is a divalent hydrocarbon radical having 5 or 6 carbon atoms, and $R^7$ is selected from the group consisting of hydrogen, monovalent hydrocarbon radicals and substituted monovalent hydrocarbon radicals, and partial hydrolyzates thereof having 2 to 10 silicon atoms per molecule.

15. The composition of claim 3, wherein the silicon compound (II) is selected from the group consisting of a silane of the formula $R^4_n SiZ_{4-n}$, where n is 0 or 1, $R^4$ is selected from the group consisting of a hydrocarbon radical having from 1 to 18 carbon atoms per radical and a halogenated hydrocarbon radical having from 1 to 18 carbon atoms per radical and Z is a hydrolyzable group selected from the group consisting of

| oxime groups | $-ON=X$ |
| amino groups | $-NR^7_2$ |
| acylamino groups | $-NR^7 COR^7$ |
| amineoxy groups | $-ONR^7_2$ |
| acyloxy groups | $-OOCR^7$ and |
| hydrocarbonoxy and substituted hydrocarbonoxy groups | $-OR^7$, | where X is selected from the group consisting of $R^5_2 C=$ and $R^6 C=$, where $R^5$ is a monovalent hydrocarbon radical having from 1 to 5 carbon atoms per radical and $R^6$ is a divalent hydrocarbon radical having 5 or 6 carbon atoms, and R7 is selected from the group consisting of hydrogen, monovalent hydrocarbon radicals and substituted monovalent hydrocarbon radicals, and partial hydrolyzates thereof having 2 to 10 silicon atoms per molecule.

16. The composition of claim 13, wherein the silicon compound (II) is selected from the group consisting of the formula $R^4{}_n Si(ON{=}X)_{4-n}$, where n is 0 or 1, $R^4$ is selected from the group consisting of a monovalent hydrocarbon radical having from 1 to 18 carbon atoms per radical and a halogenated monovalent hydrocarbon radical having from 1 to 18 carbon atoms per radical and X is selected from the group consisting of radicals of the formula $R^5{}_2 C{=}$ or $R^6 C{\equiv}$, where $R^5$ is a monovalent hydrocarbon radical having from 1 to 5 carbon atoms per radical and $R^6$ is a divalent hydrocarbon radical having 5 or 6 carbon atoms, and partial hydrolyzates thereof having 2 to 10 silicon atoms per molecule.

17. The composition of claim 14, wherein the silicon compound (II) is selected from the group consisting of the formula $R^4{}_n Si(ON{=}X)_{4-n}$, where n is 0 or 1, $R^4$ is selected from the group consisting of a monovalent hydrocarbon radical having from 1 to 18 carbon atoms per radical and a halogenated monovalent hydrocarbon radical having from 1 to 18 carbon atoms per radical and X is selected from the group consisting of radicals of the formula $R^5{}_2 C{=}$ or $R^6 C{\equiv}$, where $R^5$ is a monovalent hydrocarbon radical having from 1 to 5 carbon atoms per radical and $R^6$ is a divalent hydrocarbon radical having 5 or 6 carbon atoms, and partial hydrolyzates thereof having 2 to 10 silicon atoms per molecule.

18. The composition of claim 15, wherein the silicon compound (II) is selected from the group consisting of the formula $R^4{}_n Si(ON{=}X)_{4-n}$, where n is 0 or 1, $R^4$ is selected from the group consisting of a monovalent hydrocarbon radical having from 1 to 18 carbon atoms per radical and a halogenated monovalent hydrocarbon radical having from 1 to 18 carbon atoms per radical and X is selected from the group consisting of radicals of the formula $R^5{}_2 C{=}$ or $R^6 C{\equiv}$, where $R^5$ is a monovalent hydrocarbon radical having from 1 to 5 carbon atoms per radical and $R^6$ is a divalent hydrocarbon radical having 5 or 6 carbon atoms, and partial hydrolyzates thereof having 2 to 10 silicon atoms per molecule.

19. The composition of claim 16, wherein the silicon compound (II) is selected from the group consisting of methyltris(methylethylketoxime)silane and tetra(methyl-ethylketoxime)silane.

20. The composition of claim 17, wherein the silicon compound (II) is selected from the group consisting of methyltris(methylethylketoxime)silane and tetra(methylethylketoxime)silane.

21. The composition of claim 18, wherein the silicon compound (II) is selected from the group consisting of methyltris(methylethylketoxime)silane and tetra(methylethylketoxime)silane.

22. The composition of claim 1, wherein at least one additional substance is present in the composition which is selected from the group consisting of reinforcing inorganic fillers, nonreinforcing inorganic fillers, condensation catalysts, plasticizers, agents for promoting adhesion of silicone elastomers, pigments, soluble dyestuffs and mixtures thereof.

23. The composition of claim 2, wherein at least one additional substance is present in the composition which is selected from the group consisting of reinforcing inorganic fillers, nonreinforcing inorganic fillers, condensation catalysts, plasticizers, agents for promoting adhesion of silicone elastomers, pigments, soluble dyestuffs and mixtures thereof.

24. The composition of claims 3, wherein at least one additional substance is present in the composition which is selected from the group consisting of reinforcing inorganic fillers, nonreinforcing inorganic fillers, condensation catalysts, plasticizers, agents for promoting adhesion of silicone elastomers, pigments, soluble dyestuffs and mixtures thereof.

* * * * *

UNITED STATES PATENT AND TRADEMARK OFFICE
CERTIFICATE OF CORRECTION

PATENT NO. : 5,023,295

DATED : June 11, 1991

INVENTOR(S) : Dr. Erhard Bosch, Reinhard Maier and Dr. Dietrich Wolfer

It is certified that error appears in the above-identified patent and that said Letters Patent is hereby corrected as shown below:

Column 11, line 61, after "equal to" insert ---100---

Signed and Sealed this

Twenty-fourth Day of November, 1992

Attest:

DOUGLAS B. COMER

*Attesting Officer*  *Acting Commissioner of Patents and Trademarks*